United States Patent [19]

Herrin

[11] 4,012,716
[45] Mar. 15, 1977

[54] CODED RECORD AND METHOD OF AND SYSTEM FOR INTERPRETING THE RECORD

[75] Inventor: Carlos B. Herrin, Bellbrook, Ohio

[73] Assignee: Monarch Marking Systems, Inc., Dayton, Ohio

[22] Filed: Nov. 16, 1971

[21] Appl. No.: 199,231

[52] U.S. Cl. .................. 340/146.3 Z; 235/61.11 E
[51] Int. Cl.² ......................................... G06K 9/18
[58] Field of Search ..................... 235/61.11 E; 340/146.3 K, 146.3 Z

[56] References Cited

UNITED STATES PATENTS

| | | | |
|---|---|---|---|
| 3,225,177 | 12/1965 | Stites | 340/146.3 B |
| 3,543,007 | 11/1970 | Brinker | 340/146.3 K |
| 3,622,758 | 11/1971 | Schanne | 340/146.3 Z |
| 3,671,722 | 6/1972 | Christie | 340/146.3 K |
| 3,674,990 | 7/1972 | Kurauchi | 235/61.11 E |
| 3,701,886 | 10/1972 | Jones | 340/146.3 Z |
| 3,708,748 | 1/1973 | Nassimbene | 235/61.11 R |
| 3,716,699 | 2/1973 | Eckert | 235/61.11 E |
| 3,723,710 | 3/1973 | Crouse | 235/61.11 E |
| 3,805,175 | 4/1974 | Nassimbene | 329/104 |

Primary Examiner—Leo H. Boudreau
Attorney, Agent, or Firm—Mason, Kolehmainen, Rathburn & Wyss

[57] ABSTRACT

A machine-readable record or label includes alternating areas of different reflectivity providing a binary coded data record. The record is made by selecting the widths of the areas such that an increase in the relative widths of any two consecutive areas of like characteristics represents a binary "1" and a decrease in the relative widths of any two consecutive like areas represents a binary "0". Thus, each area in a part of the code is used in the establishment of the values of two different binary bits. A method of and system for reading or interpreting the record or label includes two pairs of light reader controlled registers in one pair of which bar widths are stored and in the other pair of which space widths are stored. In each pair, the widths of consecutive like areas are alternately stored. A sequence control steers successive width signals from the reader into a proper register in a proper register pair. A comparator coupled to the registers and the sequence control determines whether each newly stored width is greater than or less than the width of the previously stored area and stores a 1 or a 0 in a shift register.

20 Claims, 7 Drawing Figures

INVENTOR
CARLOS B. HERRIN
BY
Mason, Kolehmainen, Rathburn and Wyss
ATTORNEYS.

CODED RECORD AND METHOD OF AND SYSTEM FOR INTERPRETING THE RECORD

This invention relates to machine readable codes and records and, more particularly, to a new and improved record, method of making the record, and a method of and a system for translating or interpreting the record.

The need for acquiring data at, for example, a point of sale is well recognized, and many attempts have been made in the past to provide records, tags, or labels and reading and interpreting systems that are capable of being used in retail stores at the point of sale and for inventory. In this application, the records must be easily and economically made and must be such that, for example, handling by customers does not deface the coding or render the code incapable of accurate reading. Further, the record should be such that it can be read either by a portable manually manipulated reader or a stationary machine reader of low cost. Further, when the record or label is to be read by a manual reader, it should be such that the record interpretation is as independent of speed and direction of reading as is possible.

The copending application of Bruce W. Dobras, Ser. No. 104,955, filed Jan. 8, 1971, discloses a bar coded record in which consecutive pairs of bars and the spaces therebetween are width modulated so that the increasing or decreasing relative widths of each bar-space and space-bar pair represent binary 0s and 1s. This record is frequently produced by printing inked, nonreflective bars on a light reflective base with both the black bars and the intervening reflective spaces or white bars encoded by width. Further, it is desirable to make these bars and spaces as narrow as possible so as to increase bit density. The cost of equipment for printing these records in retail establishments is reduced substantially by using, for example, preformed print elements carrying bars in the coded format which are inked and applied to the record stock.

It has been determined that, in some applications, the quantity of ink applied or the porosity of the stock causes the bars to spread in width with the result that the adjacent spaces become narrower. Thus, a two-fold change in the relative bar and space widths occurs with the result that absolute widths may have to be increased to maintain a sufficient relative width increase or decrease to insure correct code translation. These increases reduce bit density.

Accordingly, one object of the present invention is to provide a new and improved coded record.

Another object is to provide a coded record using width modulated areas of different characteristics in which the width of an area is not assigned an absolute binary value but provides a binary value by comparison with the width of an adjacent area of like characteristics.

A further object is to provide a method of making binary coded records using alternate areas of different characteristics by varying the relative widths of consecutive pairs of areas of like characteristics in accordance with data to be encoded on the record.

Another object is to provide a method of interpreting or translating records coded in alternate areas of different characteristics and varying widths by comparing the widths of successive areas of like characteristics and establishing bit values in dependence on their relative widths.

A further object is to provide a system for reading records coded in areas of varying widths and different characteristics including means for separately storing the widths of adjacent pairs of like characteristic areas, means for sequentially comparing the stored widths, and means for assigning different bit weights or values in dependence on the determined relative widths.

In accordance with these and many other objects, an embodiment of the present invention comprises a record, tag, or label made, for example of a member having a light reflective surface on which are recorded a plurality of nonreflecting bars. The widths of the nonreflecting bars and the reflecting bars disposed between and defined by the nonreflecting bars are modulated in width so that, for example, when the width of any one bar in a pair of like bars, either reflective or nonreflective, is greater than the width of the preceding bar, a binary 1 is encoded. A binary 0 is encoded whenever the width of any given bar in a pair of like bars, either reflective or nonreflective is less than the width of the immediately preceding bar. These records can be easily produced using nothing more than conventional paper or card stock and simple coding elements either individual or in sequence for applying ink or other nonreflective material to the record. The record making apparatus can be such as to sequentially or concurrently record a plural character message preceded and followed by start and stop codes in the same manner as the characters of the message. Since any spreading of the ink causes all inked bars to increase in width and all reflective bars or spaces to decrease in width and since only like bars are width compared, the coded width differentiation is maintained.

This record is interpreted by a manually held light pen including, for example, a light source for directing light onto the record and a light responsive element providing a varying output in dependence on the quantity of reflected light received from the record, although this reading assembly could as well be incorporated into a stationary record reading mechanism. The record is read by producing relative movement between the reader and the record in either a forward or backward direction requiring only that the reader pass across the entire coded message at some point along its length. The analog signal developed by the photoresponsive unit in the reader is digitized into a two-level signal representing white or black and, in dependence on the level and length of this signal, gates a free running clock into one of four counters, two black width counters and two white width counters, to store a bar width representation. A sequence control steers the clock pulses into the proper pairs of registers, and the proper register in the pair in dependence on the black or white characteristic of the bar and its position in the bar sequence. The outputs of each pair of counters are connected to one of two comparator circuits black and white, which determine the relative stored widths of the two bars and shifts a binary 1 or 0 into the first stage of a shift register in dependence thereon. The sequence control renders the black and white comparator circuits alternately effective to control the entry of data into the shift register.

The contents of the shift register are examined bit-by-bit until a start code is recognized. Thereafter, the contents of the shift register are transferred character-by-character to an output means until a stop code is detected.

Many other objects and advantages of the present invention will become apparent from considering the following detailed description in conjunction with the drawings in which:

Figure 1:
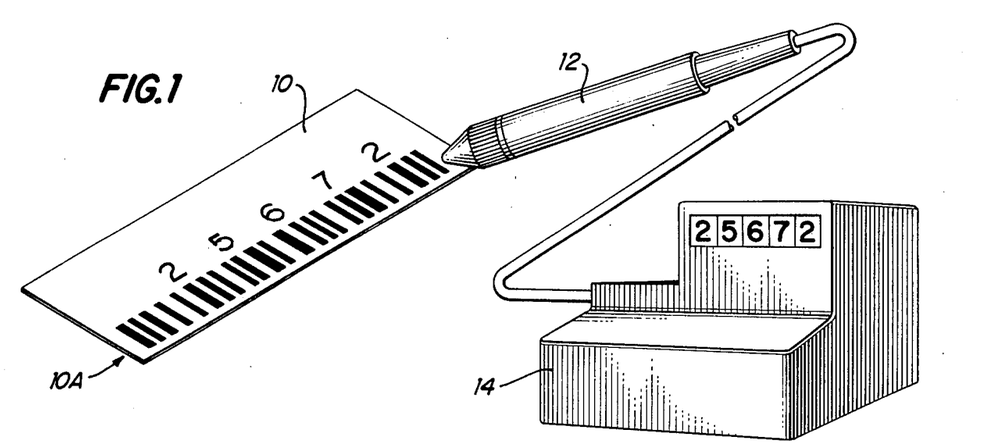
FIG. 1 is a schematic diagram illustrating a record embodying the present invention in conjunction with a reader and interpreting circuit therefor.

Referring now more specifically to FIG. 1 of the drawings, therein is illustrated a record 10 embodying the present invention which is capable of being read or interpreted by a manual or portable reader 12, the output of which is coupled to a record translating or interpreting system 14 embodying the present invention. In the illustration of FIG. 1, an edge portion 10A of the record, tag, or label 10 is provided with a plural digit or character message preceded by a start code and followed by a stop code (not shown), all encoded in binary form in accordance with the present invention. The encoded digit or character can also be recorded in visually recognizable form. As illustrated in FIG. 1, the message comprises five numerical digits "25672", although the message could include any variable number of digits recorded in any position on the record 10.

Figure 2:
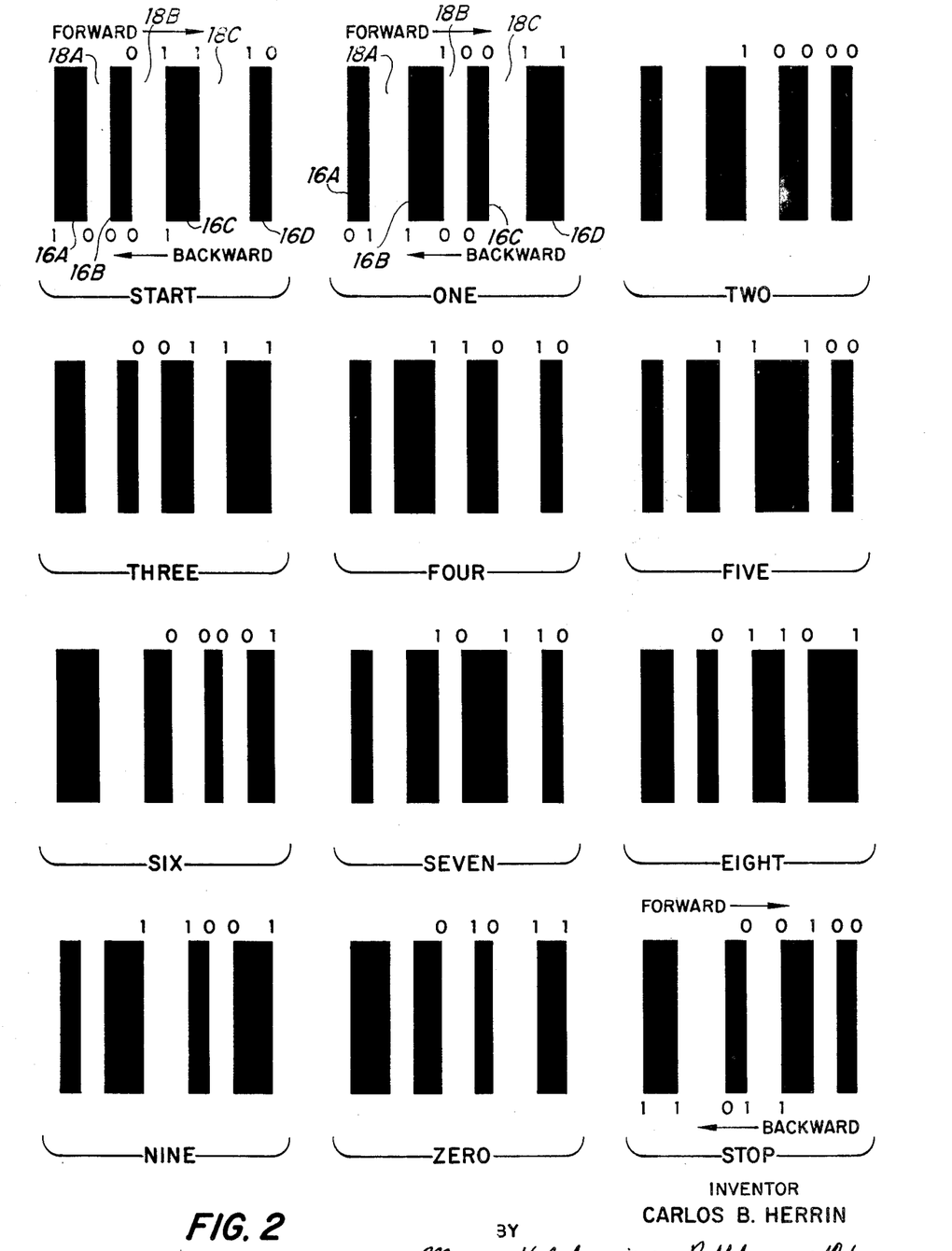
FIG. 2 is a schematic illustration of one set of codes for the digits 1–9, 0, start, and stop embodying the present invention.

FIG. 2 of the drawings illustrates one set of codes embodying the present invention which provides an odd parity, five bit character code using four bars or areas 16A–16D defining three intervening areas or bars 18A–18C of a different characteristic. In a preferred embodiment, the bars 16A–16D are formed by printing a substantially nonreflective material, such as black ink, on the reflective surface of the record 10 so that the areas or bars 18A–18C comprise the light reflective surface of the record. The different characteristics of the bars 16A–16D and 18A–18C could also be defined by the use of different materials, such as the presence or absence of magnetic material or materials of sufficiently different light reflecting characteristics.

The widths of the bars 16 and 18 is selectively varied or modulated to encode binary 1 and 0 information. Using four bars in a five bit code, each of the bars 16 and 8 can have one of three different widths which can be generally referred to as narrow, middle, and wide widths. The coding technique used is that of providing an increasing width on successive bars of like characteristics, i.e., reflective or nonreflective, to represent a binary 1 and of providing a decreasing width on successive bars of like characteristics to represent a binary 0. Since encoding is accomplished by relative width modulation, the narrow, middle, and wide widths need not have fixed values in the various character codes or even within one character code so long as their relative values maintain the encoding criteria. Increasing the difference between and the values of the narrow, middle, and wide widths results in a loss of bit density or packing on the record. On the other hand, decreasing the values of and the difference between widths increases bit density or packing.

To illustrate the width coding embodying the present invention using the code for the digit one, the code assigned to this digit reading left to right is 10011, as illustrated immediately above the bars 16 and 18 in FIG. 2. Thus, the first nonreflective bar 16A is assigned a narrow width, and the following nonreflective bar or area 16B is assigned the middle width. On interpretation, the width of the bar 16B is compared with the width of the bar 16A and found to be greater, and the system 14 recognizes this greater than relationship as denoting a binary 1 value. To encode the 0 appearing next in the code, the first reflective bar or space 18A is assigned a middle value, and the second bar 18B is assigned a narrow width. During reading, the system 14 next compares the narrow width of 18B with the middle width of 18A and recognizes this decreasing width relation of the spaces as the first binary 0 in the code for the character one. Since the next code bit in the code for the digit one is a binary 0, the next bar 16C is assigned the narrow width so that when the width of this bar is compared with the middle width of the bar 16B, a less than relationship is again established to encode the binary 0. To encode the next binary 1 in the code for the digit one, the bar 18C is made of a middle width, and when compared with the narrow width of the bar 18B results in a binary 1. Similarly, the next non-reflective bar 16D is made of a middle width and, when compared with the narrower width of the bar 16C, results in a binary 1. Thus, the width modulation of the bars 16 and 18 when read in a forward direction results in the assigned five bit code 10011 with odd parity.

As set forth above the message information on the record 10 provided by the code such as the code occupying the portion 10A of the record 10 can be read in either a forward or a backward direction. Obviously, when the code is read in a reverse or backward direction, the binary significance of the width modulated bars is changed, and a correct code for the digit may not be provided. This is illustrated in the coded representation of digit one in FIG. 2. The binary digits appearing adjacent the lower edges of the bars indicate that when this code is read in a reverse or backward direction as shown by the arrow, the input from the reader 12 to the system 14 considered in the direction of scanning is 00110. If this entry is reversed in order to 01100 and complemented, the code 10011 results. Thus, any width modulated code read in a backward or reverse direction can be converted to a true code by inverting and complementing the results obtained by reading the code in a reverse or backward direction.

As noted above, the narrow, middle, and wide widths for the bars 16, 18 need not have the same values either within a single character code or in the different character codes because of the increasing and decreasing relative width techniques used to encode. In fact, having empirically determined that the velocity of relative movement between the reader 12 and the record 10 usually cannot be varied by a manual operator more than 0.6%/mil of relative movement, it is possible to optimize the widths assigned to the bars 16, 18 in the codes to yield maximum character density while avoiding translation error arising from human velocity changes. A table listing one representative assignment of bar width values is set forth below.

|  |  | Width in Mils | | | | | | |
|---|---|---|---|---|---|---|---|---|
| Character | Code | Bar 16A | Space 18A | Bar 16B | Space 18B | Bar 16C | Space 18C | Bar 16D |
| 1 | 10011 | 8 | 15 | 13.4 | 9 | 8 | 14.1 | 14.3 |
| 2 | 10000 | 8 | 16.8 | 15.5 | 12.3 | 11.3 | 9 | 8 |
| 3 | 00111 | 11.7 | 12.3 | 8 | 9 | 12.2 | 12.6 | 17.1 |
| 4 | 11010 | 8 | 9 | 15.5 | 12.5 | 11.4 | 16.4 | 8 |
| 5 | 11100 | 8 | 9 | 12.6 | 13.9 | 20.3 | 9 | 8 |
| 6 | 00001 | 16.1 | 17.2 | 10.7 | 12.4 | 7 | 9 | 10.4 |
| 7 | 10110 | 8 | 13 | 12.2 | 9 | 17.3 | 13.5 | 8 |
| 8 | 01101 | 12.3 | 9 | 8 | 13.1 | 12.7 | 9 | 18.9 |
| 9 | 11001 | 8 | 9 | 15.2 | 17.5 | 8 | 9 | 15.2 |
| 0 | 01011 | 15.2 | 9 | 10.8 | 12.7 | 7 | 17.1 | 11.1 |
| Start | 01110 | 12.2 | 9 | 8 | 13 | 12. | 19.1 | 8 |
| Stop | 00100 | 13 | 18.4 | 8 | 13.2 | 12.4 | 9 | 8 |

Using these code assignments, a character density of ten characters/inch is obtained while avoiding velocity induced errors in record translation.

Figure 3:
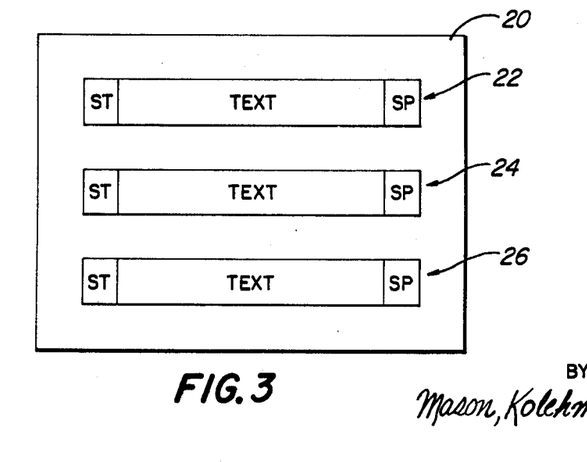
FIG. 3 is a plan view of a label or record embodying the present invention.

FIG. 3 illustrates a record 20 embodying the present invention containing three separate messages 22, 24, and 26 printed in parallel, spaced relation on the record 20. Each of the messages 22, 24, 26 is preceded by a start code as shown in FIG. 2 followed by a plural character message, each consisting of a plurality of bits encoded in accordance with the code illustrated in FIG. 2. Each of these messages is terminated by a stop code. The messages 22, 24, and 26 on the record 20 can be read all in a forward or all in a reverse direction, or in any intermixing of forward and reverse directions. The only requirement that must be met for correct interpretation of the record 20 and the messages 22, 24, and 26 thereon is that the relative movement between the record 20 and the reader 12 is such that each of the bars in the codes of the message passes by the reader 12.

Figure 5A:
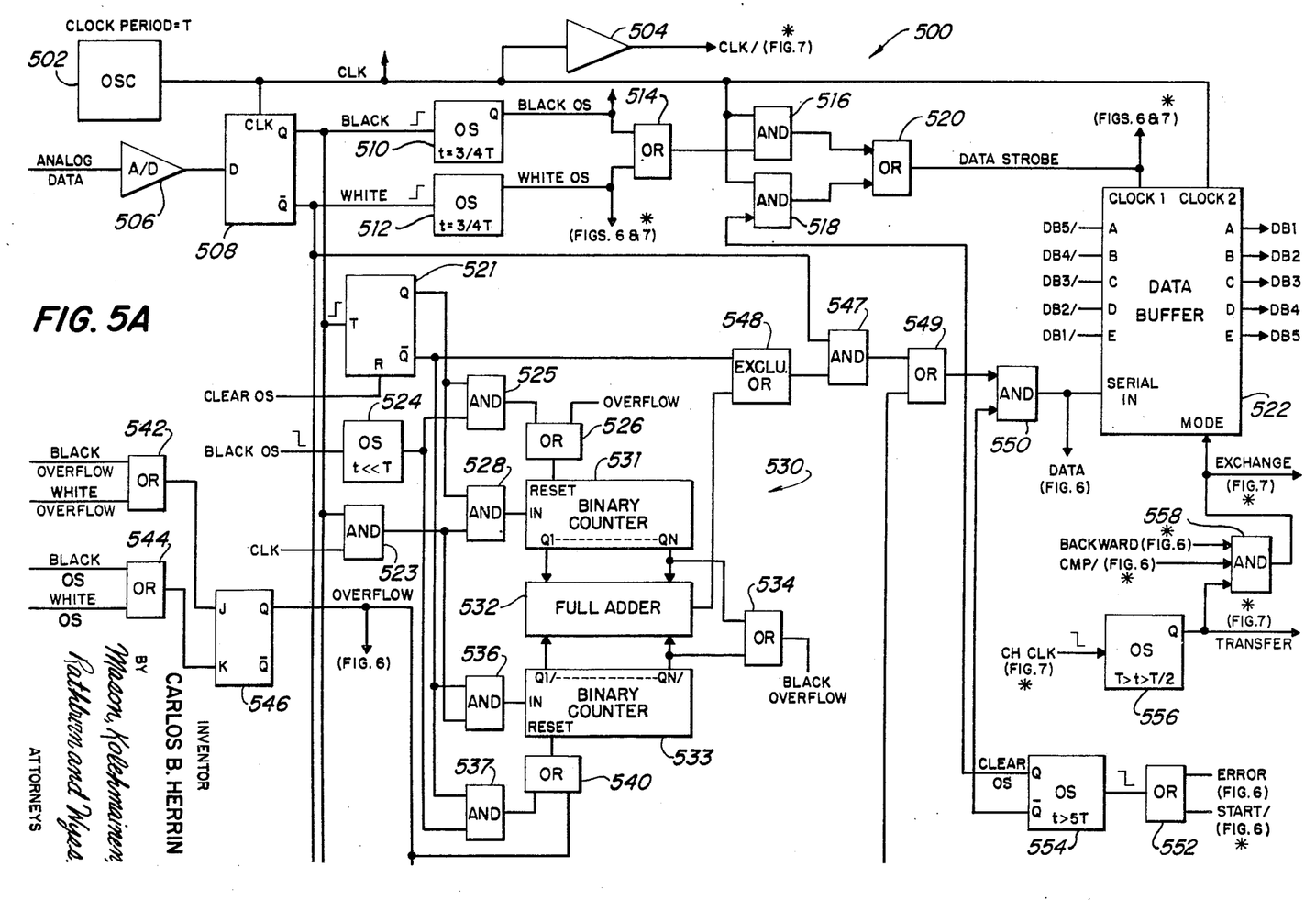
FIGS. 5A and 5B, when placed adjacent each other, provide a schematic diagram in block logic form illustrating the basic data flow in a record translating system embodying the present invention.
Figures 5B, 6:
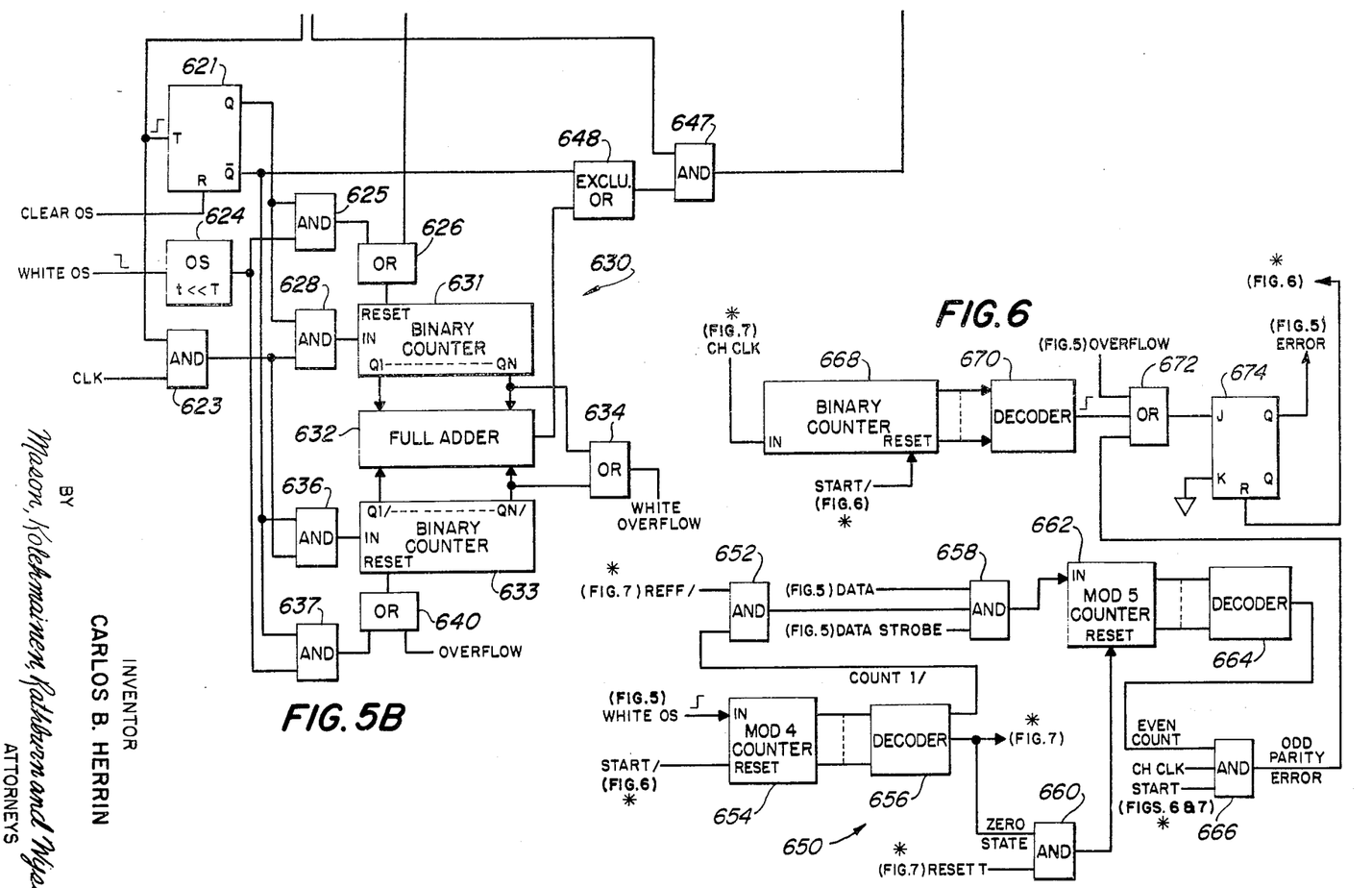
FIG. 6 is a logic block diagram of circuits included in the record translating system of the present invention providing certain control and error signals.

Referring now more specifically to the logic block diagrams of FIGS. 5 and 6, these circuits illustrate the record interpreting system 14 and are shown in simplified form in AND and OR logic. Although the system 14 is illustrated in FIGS. 5 and 6 in this simplified form to facilitate an understanding of the invention, an embodiment of the system 14 can be constructed in NAND and NOR logic using series 54/74 TTL logic elements manufactured and sold by Texas Instruments Incorporated of Dallas, Texas. The conversion of the illustrated AND and OR logic elements to TTL logic is well within the expected skill of a designer familiar with digital logic.

The system 14 shown in FIGS. 5 and 6 is, in a number of respects, quite similar to the system shown and described in the above-identified Dobras application. Therefore, this application does not disclose those similar components, and the Dobras application is hereby incorporated by reference. Certain components common to the Dobras application are disclosed in this application, and like reference numbers are used in the Dobras and present applications to designate like components. In addition, control signals generated in the Dobras application and used in the present application or generated in the present application and used in the circuits of the Dobras application are identified by an asterisk disposed adjacent a drawing figure reference identifying the drawing in the Dobras application to which the control signal is supplied or from which the signal is received.

Referring now more specifically to FIGS. 5 and 6 of the drawing, FIG. 5 illustrates a data interpreting circuit 500 for translating the coded records 10 into data usable by an output means (not shown) such as the display shown in the Dobras application. FIG. 6 illustrates an error checking or detecting circuit 650 which provides an error indication whenever a received character is not provided in the desired odd parity code or when the message includes more than a maximum number of characters or when the width of any area exceeds a given maximum limit.

When the system 14 is not actually engaged in translating a record 10, this system is in a scan mode searching for either a stop code read in a backwards or reverse direction or a start code read in a forward direction. On detection of one of these codes, the system 14 is set into its read mode to translate the data from the record 10. This status of the system 14 is basically established by a start flip-flop shown in the Dobras application which is placed in its reset condition either by an error or the completion of the satisfactory reading of a message. In its reset condition, a start signal START is at a low or 0 level, and an inverted start signal START/ is at a high or 1 level. Throughout the drawings, an inverted signal is indicated by a "/" following the signal designation. The signal START/ is used among other purposes to reset a binary counter 668 (FIG. 6) which controls the production of an indication that an excess number of characters has been received and to reset a modulo four counter 654 which is used to count the number of bits in a complete character. When the modulo four counter 654 is reset, a decoder 656 coupled to its output supplies a high level signal ZERO STATE which indicates that the character counter 654 is reset. The counter 654 The counter complete characters, and the counter 668 forms a part of the error detecting circuit 650.

Figure 4:
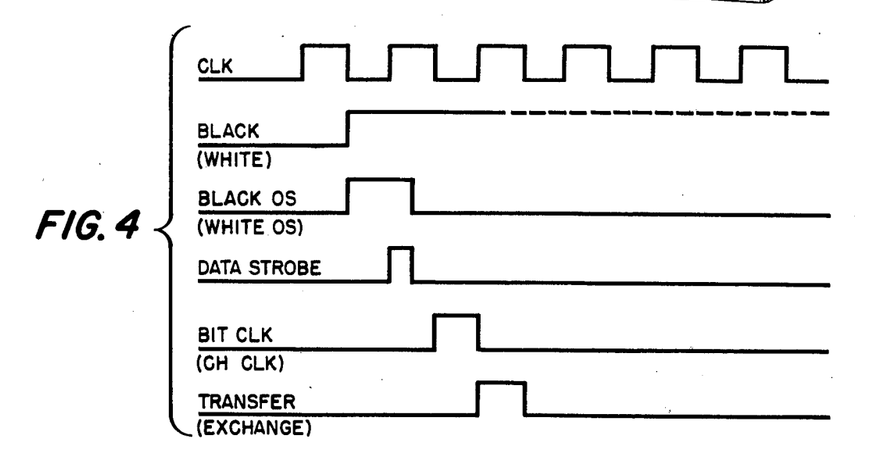
FIG. 4 is a table illustrating timing and control signals used in the translating or interpreting circuit of the present invention.

The operations of the system 14 are synchronized or clocked by an oscillator 502 (FIG. 5A) which provides an output clock signal CLK and an inverted clock signal CLK/ through an inverter 504. The clock period provided by the oscillator 502 can be of any suitable value such as 80 KHZ which is schematically represented in the drawings as having a period T. The waveform of the clock signal CLK is shown in the first line of FIG. 4.

The input to the system 14 is provided by the reader 12 (FIG. 1), the output of which is coupled to the input of an analog-to-digital converter 506 which provides a high level signal to the D input of a D type flip-flop 508 representing a black or nonreflective bar 16 and a low level signal representing a white bar or area 18. The construction of the light pen or reader 12 can be of any of a number of types well known in the art such as those shown, for example, in U.S. Pat. No. 3,509,353 or French patent No. 1,323,278. Further, the analog-to-digital converter 506 can comprise any one of a number of such circuits that are well known in the art and, for example, can comprise a differential amplifier with wave shaping and level control.

Assuming that the system 14 is in a scan mode and that a message on a record 10, 20 is to be read in a forward direction, relative movement is produced between the reader 12 and the record 10, 20 so that the reader or light pen 12 first reaches the black bar 16A in the start code. At this time, the output of the unit 506 rises to a high level, and the flip-flop 508 is set on the next occurring clock pulse CLK. The Q output of the flip-flop 508 rises to a more positive level to provide a black signal BLACK (line 2 in FIG. 4). This signal triggers a one-shot 510 to provide a positive-going output signal BLACK OS whose duration is approximately three-quarters of the length of the clock period (line 3 in FIG. 4). This signal is applied in turn to another one-shot 524, and the trailing edge of the signal BLACK OS triggers the one-shot 524 to provide a positive-going signal used to selectively reset one of a pair of width storage counters 531 and 533 in a black bar width storage unit 530. In the logic diagrams, the approximate durations of the output signals from the monostable circuits relative to the clock period are indicated in the rectangular symbol for the one-shot.

The selective resetting of the counters 531 and 533 in the black bar counter 530 as well as the storage of black bar width representations therein is controlled by a sequence control including a toggle-type flip-flop 521 whose input is supplied with the signal BLACK. On the leading edge of the signal BLACK as the reader 12 enters the first bar in the start code, the flip-flop 521 is set so that its Q terminal output rises to a high level potential and its Q̄ terminal output drops to a low level potential. The potential at the Q terminal of the set flip-flop 521 enables one input to an AND gate 525 in a reset circuit for and one input to an AND gate 528 in an input circuit to the counter 531. The low level potential at the Q̄ terminal of the set flip-flop 521 inhibits one input to an AND gate 537 in a reset circuit for and one input to an AND gate 536 in an input circuit to the counter 533. Thus, the counter 531 is conditioned by the flip-flop 521 for being reset and for receiving the width of the first black bar 16A in the start code.

More specifically, when the one-shot 524 is triggered to supply the positive-going pulse at its output, this pulse is coupled through the AND gate 525 and an OR gate 526 to reset the counter 531 for receiving a count representing the width of the first black bar 16A in the start code. The output from the one-shot 524 does not reset the counter 533 because the gate 537 is inhibited by the flip-flip 521. To transfer the number of clock pulses proportional to the width of the first black bar 16A into the counter 531, and AND gate 523 is provided, one input of which is supplied with the signal BLACK and is thus enabled whenever the reader 12 enters one of the black bars 16. The other input to the AND gate 523 is supplied with the clock signal CLK. Accordingly, the AND gate 523 supplies a series of positive-going pulses through the enabled AND gate 528 to advance the binary counter 531 to a setting representing the width of the first black bar. This series of clock pulses appearing at the output of the AND gate 523 is not effective to advance the setting of the counter 533 because of the inhibit applied to one input of the AND gate 536 by the set flip-flop 521.

When the reader 12 reaches the end of the first black bar 16A in the start code and enters the reflective area of the first reflective bar 18A, the level of the output from the unit 506 drops to a low level, and the next clock pulse CLK resets the flip-flop 508 so that the signal BLACK drops to a low level, and a white level output signal WHITE rises to a high or 1 level. The termination of the signal BLACK inhibits the gate 523 so that the binary counter 531 now stands in a setting representing the width of the first black bar 16A in the start code.

The signal WHITE triggers a one-shot 512 similar to the one-shot 510 to provide an output signal WHITE OS (line 3 in FIG. 4) which is applied to the input of another one-shot or monostable circuit 624 (FIG. 5B). The trailing edge of the signal WHITE OS triggers the one-shot 624 to provide a positive-going signal used to selectively reset one of a pair of width storage counters 631 and 633 in a white bar width storage unit 630.

The selective setting of the white bar width counters 631 and 633 in the white bar storage unit 630 as well as the storage of white bar width representations is controlled by a sequence control including a toggle-type flip-flop 621 whose input is supplied with the signal WHITE. On the leading or positive-going edge of the signal WHITE, the flip-flop 621 is set so that its Q terminal output rises to a high level potential, and its Q̄ level terminal output drops to a low level potential. The potential at the Q terminal of the flip-flop 621 enables one input to an AND gate 625 in a reset circuit for and one input to an AND gate 628 in an input circuit to the counter 631. The potential at the Q̄ terminal of the set flip-flop 621 inhibits one input to an AND gate 637 in a reset circuit for and one input to an AND gate 636 in an input circuit to the counter 633. Thus, the sequence control gating for the white bar storage unit 630 is set so that the counter 631 can be cleared and set to receive a series of clock pulses proportional or corresponding to the width of the first white bar 18A in the start code.

More specifically, the positive-going pulse provided at the output of the one-shot 624 is forwarded through the enabled AND gate 625 and an OR gate 626 to reset the counter 631. The counter 633 is not reset at this time because the AND gate 637 is inhibited by the flip-flop 621. To provide means for advancing the counter 631 to a setting representing the width of the first white bar 18A, and AND gate 623 is provided, one input of which is supplied with the signal WHITE. The signal CLK is supplied to the other input of the gate 623 so that a series of clock pulses proportional in number to the width of the first white bar 18A is forwarded through the AND gate 628 to advance the setting of the counter 631.

When the reader 12 reaches the end of the first white bar 18A in the start code and enters the nonreflective area of the second black bar 16B, the output of the unit 506 rises to a high level, and the next clock pulse CLK sets the flip-flop 508 so that the signal WHITE drops to a low level, and the signal BLACK rises to a high level. The termination of the signal WHITE applies an inhibit to the gate 623 so that the binary counter 631 now stands in a setting representing the width of the first space or white bar 18A in the start code.

When the signal BLACK rises again to its high level on entering the second black bar 16B, the positivegoing edge thereof resets the flip-flop 521 so that the AND gates 525 and 528 are inhibited, and one input to each of the gates 536 and 537 is enabled. This operation of the sequence control including the flip-flop 521 prevents any alteration in the width of the first black bar 16A stored in counter 531 and enables the resetting of the counter 533 and the storage of the width of the second black bar is this counter. To accomplish this, the positive-going pulse appearing at the output of the one-shot 524 resulting from the signal BLACK OS is forwarded through the AND gate 537 and an OR gate 540 to reset the counter 533.

To store the width of the second black bar 16B in the counter 533, the AND gate 523 is again enabled by the signal BLACK, and the clock pulses CLK appearing at the output thereof are now forwarded through the enabled AND gate 536 to advance the binary counter 533 to a setting proportional to or representing the width of the second black bar.

When the reader 12 passes out of the second black bar 16B and into the second white bar 18B, the signal BLACK drops to a low level, and the signal WHITE rises to a high level. When the signal BLACK drops to a low level, the gate 523 is inhibited to prevent any alteration in the setting of the counter 533 now storing the width of the second black bar 16B. The widths of the first and second black bars 16A and 16B stored in the counters 531 and 533 are compared to control the entry of the first bit into storage at the same time the value of the width of the second white bar 18B is being stored in the white bar storage means 630.

More specifically, this comparison or bit value determination is performed by a full adder 532 and an exclusive OR gate 548. The "true" or Q outputs of the black bar counter 531 are coupled to the corresponding inputs of the full adder 532, and the "false" or $\overline{Q}$ outputs of the black bar counter 533 are coupled to the other set of inputs to the full adder 532. The most significant carry output from the full adder 532 is coupled to one input of the exclusive OR gate 548. The other input to the exclusive OR gate 548 is coupled to the $\overline{Q}$ terminal of the flip-flop 521 in the sequence control. Since the flip-flop 521 is now in a reset condition, the more positive potential at the $\overline{Q}$ terminal signifies that the value stored in the counter 533 representing the width of the second black bar 16B is to be compared with the width of the first black bar 16A stored in the counter 531.

Since the full adder 532 is provided with the value standing in the black counter and the 1s complement of the value standing in the black counter 533, the full adder 532 effectively subtracts the values standing in the counters 531 and 533. This means that the full adder 532 will supply a high level or 1 carry to one input of the exclusive OR gate 548 when the value standing in the black counter 531 exceeds the value standing in the black counter 533. Conversely, when the value standing in the black counter 533 exceeds the value standing in the black counter 531, the carry is consumed in the full adder 532, and the coupled input to the exclusive OR gate 548 remains at its low or O level. It will be appreciated that a true subtraction can be performed by the full adder 532 only when a 2s complement is supplied from the counter 533 to the corresponding inputs of the full adder 532. However, because of the large differences in the binary counters 531 and 533 resulting from the use of high frequency clock pulses CLK and the margins between the widths of the bars 16A and 16B, the error of −1 arising from the use of the 1s complement as contrasted with the 2s complement is not significant.

Accordingly, one input to the exclusive OR gate 548 receives a high level or 1 signal when the first black bar 16A is wider than the second black bar 16B and a low level or O signal when the second black bar 16B is greater than the first black bar 16A. The other input to the exclusive OR gate 548 is used to denote the sequence of comparison. As noted above, a high level or 1 input is supplied to the upper input of the exclusive OR gate 548 when the value in the counter 533 is to be compared to the width of the bar stored in the counter 531 to determine whether the width in the counter 533 is greater or less than the width in the counter 531. Conversely, when a value previously stored in the counter 533 is to be compared with the width later stored in the counter 531 to determine whether the width in the counter 531 is greater than or less than the prior width stored in the counter 533, the sequence control flip-flop 521 is set, and a low level potential is applied to the upper input of the exclusive OR gate 548.

The truth table for the full adder 532 and the exclusive OR gate 548 can be expressed as follows:
1. When the width just stored in the counter 533 is evaluated to determine whether it is greater than or less than the width previously stored in the counter 531, the upper input to the exclusive OR gate 548 is held at a high or 1 level by the reset flip-flop 521, and
   a. the output of the gate 548 is low representing a binary 0 when the width of the bar in the counter 531 is greater than the width of the bar in the counter 533 because the carry out of the full adder 532 is 1;
   b. the output of the gate 548 is at a high level representing a binary 1 when the width of the bar in the counter 533 is greater than the width of the bar in the counter 531 because the carry from the full adder 532 is at a low level or 0;
2. When the width just stored in the counter 531 is evaluated to determine whether it is greater than or less than the width previously stored in the counter 533, the upper input to the exclusive OR gate 548 is held at a low or 0 level by the set flip-flop 521, and
   a. the output of the gate 548 is high representing a binary 1 when the width of the bar in the counter 531 is greater than the width of the bar in the counter 533 because the carry out of the full adder 532 is 1;
   b. the output of the gate 548 is low representing a binary 0 when the width of the bar in the counter 533 is greater than the width of the bar in the counter 531 because the carry from the full adder 532 is at a low level or 0.

Referring back to the described sequential operation of the circuit 500 during the reading of the initial portion of the start code, the width of the second black bar 16B in the start code stored in the binary counter 533 is less than the width of the first black bar 16A stored in the counter 631. Further, the flip-flop 521 is reset indicating that the last value stored in the black bar storage means 530 was stored in the counter 533. Thus, both inputs to the exclusive OR gate 548 are at a high level, and the output from this gate is at a low level representing a binary 0. The output from the gate 548 is applied to one input of an AND gate 547, the other input of which is supplied with the signal WHITE. This means that the gate 547 is enabled to forward the results of a comparison performed on the contents of the black bar register 530 only when a value is being entered into the white bar storage means 630. Since the exclusive OR gate 548 supplies a low level signal to the AND gate 547, the output of this gate is at a low level, and the output of a connected OR gate 549 is also at a low level. This low level signal at the output of the OR gate 549 is applied to one input of an AND gate 550, the other input of which is held at a more positive level by the output of a one-shot 554. Thus, the AND gate 550 provides at its output a low level signal DATA representing the binary 0 decoded by the full adder 532 and the exclusive OR gate 548. Thus, a low level binary 0 representing signal is applied to the serial in terminal of a data buffer 522.

The data buffer 522 is of a known construction and can comprise, for example, in TTL logic a pair of SN7495 data buffers produced by Texas Instruments, Incorporated. This data buffer includes a pair of clock inputs designated as clock 1 and clock 2 which are selectively rendered effective under the control of the level of the signals applied to a mode input terminal. When the level of the signal applied to the mode input is at a low or O level, the normal condition, a positive-going signal applied to the clock 1 input shifts the value provided at the serial in terminal into the first stage of a five stage shift register. This input appears at an output terminal A to provide an output signal DB1. The outputs of the remaining four stages of the shift register appear at terminals B-E on the right-hand edge of the logic block for the buffer 522 and provide corresponding output signals DB2-DB5.

The data buffer 522 also provides inverted outputs DB1/-DB5/ which are returned to a set of five parallel inputs to the five stages of the shift register in the data buffer 522. These input terminals are designated A-E adjacent the left side of the logic block for the data buffer 522. As illustrated in FIG. 5A, the inverted or complemented output of the fifth stage DB5/ is applied to the parallel input of the first stage of the terminal A. The remaining inverted or complimented outputs of the shift register are similarly returned and inverted in center-folded order to the remaining parallel inputs B-E. The parallel input to the data buffer 522 is controlled by signals applied to the clock 2 input whenever the level of the signal applied to the mode input to the data buffer 522 is at a high level.

As set forth in detail in the above-identified Dobras application, the level of the signal now applied to the mode input of the buffer 522 is at a low level, and a low level signal representing a binary 0 is also applied to the serial input terminal of the data buffer 522 from the AND gate 550 as a result of the above-described comparison. This comparison was initiated, as described above, by placing the signal WHITE at a high level. This again triggers the monostable circuit 512 to provide a more positive output which is forwarded through an OR gate 514 to one input of an AND gate 516, the other input of which is supplied with a clock signal CLK. When the signal CLK next goes positive, the gate 516 is fully enabled and provides a more positive signal at its output which is forwarded through an OR gate 520 to provide a data strobe signal DATA STROBE to the clock 1 input of the data buffer 522 (lines 1, 2, 3, and 4 in FIG. 4). The positive-going signal at the clock 1 input of the buffer 522 reads the 0 from the serial input terminal into the first stage of the shift register. Thus, the first bit of the start code is now stored in the data buffer 522.

At the same time that the comparison of the widths of the two black bars stored in the counters 531 and 533 is taking place, the high level signal WHITE generated on entering the second white bar 18B controls the sequence control including the flip-flop 621 to store the value of the second white bar in the counter 633. The flip-flop 621 is controlled by the leading edge of the signal WHITE to be operated to a reset condition in which the gates 625 and 628 are inhibited to prevent any change in the stored width of the first white bar in the counter 631. The resetting of the flip-flop 621 partially enables the gates 636 and 637. Accordingly, when the signal WHITE OS is generated, the monostable circuit 624 forwards a momentary positive signal through the enabled AND gate 637 and an OR gate 640 to clear the counter 633. The signal WHITE enables the AND gate 623 so that the clock signals CLK are forwarded through the AND gate 636 to store the value of the second white bar 18B in the binary counter 633 in the manner described above.

As the reader 12 leaves the second white bar or space 18B and enters the third black bar 16C, the flip-flop 508 is again clocked so that the signal BLACK rises to a high level and the signal WHITE drops to a low level. This transition in the levels of the signals BLACK and WHITE controls the sequence flip-flops 521 and 621 to store the width of the third black bar 16C in the binary counter 531 and to compare the width of the white bar 18B just stored in the binary counter 633 with the width of the white bar 18A previously stored in the binary counter 631. The drop in the level of the signal WHITE also inhibits the gate 547 so that a bit representing output cannot be derived from the exclusive OR gate 548.

With regard to the comparison of the white bar width value stored in the white bar storage means 630, the outputs of the counters 631 and 633 are connected to a full adder 632 in the same manner as in the black bar storage assembly 530, and the output of the full adder 632 similarly is connected in the same manner to one input of an exclusive OR gate 648, the output of which is connected as one input to a steering AND gate 647. The other input to the AND gate 647 is supplied with the signal BLACK which is now at a high level to partially enable the AND gate 647 and to permit the transfer of the decoding results to the OR gate 549. The other input to the exclusive OR gate 648 is connected to the Q terminal of the steering flip-flop 621 in the same manner as described above in conjunction with the OR gate 548. In addition, the truth table for the full adder 632 and the exclusive OR gate 648 is the same as that set forth in detail above in conjunction with the full adder 532 and exclusive OR gate 548 substituting reference numbers 6-- for reference numbers 5--.

Since the width of the second white bar 18B in the start code stored in the binary counter 633 is greater than the width of the first white bar 18A stored in the binary counter 631 and since the flip-flop 621 is now reset to indicate that the width in the counter 633 is to be checked to determine whether it is greater than or less than the width stored in the counter 631, the exclusive OR gate 648 provides a more positive output signal which is forwarded through the enabled AND gate 647 to the lower input to the OR gate 549. This provides a more positive output signal from the gate 549 which is forwarded through the enabled AND gate 550 to the serial input terminal of the data buffer 522. The signal BLACK OS generated by the signal BLACK is coupled through the gates 514, 516, and 520 in the manner described above to develop the signal DATA STROBE which clocks the binary 1 into the first stage of the data buffer 522 and shifts the previously detected binary 0 into the second stage.

With regard to the black bar counter assembly 530, the high level signal BLACK sets the flip-flop 521 to enable the gates 525 and 528 and to inhibit the gates 536 and 537. The inhibit applied to the gates 536 and 537 prevents any change in width value of the second black bar 16B stored in the binary counter 533. The enabling of the gate 525 permits the one-shot 524 to clear from the counter 531 the width value of the first black bar 16A previously stored therein. The enabling of the gate 528 enables the width of the third black bar 16C to be stored in the binary counter 531 in the manner described above.

As the reader 12 leaves the third black bar 16C and enters the third white bar 18C, the status of the flip-flop 508 is again changed so that the signal BLACK drops to a low level and the signal WHITE rises to a high level. This transition in the level of the signals BLACK and WHITE controls the sequence controls including the flip-flops 521 and 621 so that the width of the third black bar 16C just stored in the binary counter 531 is compared with the width of the second black bar 16B previously stored in the binary counter 533. In addition, the value of the first white bar 18A is cleared from the binary counter 631 in the white bar storage assembly 630, and the width of the third white bar 18C is stored therein. Further, the low level of the signal BLACK inhibits the gate 647 to prevent the input of data to the data buffer 522 from the white bar assembly 630 into which a value is being read.

With reference to the black bar storage assembly 530, the flip-flop 521 is now set so that a low level potential is supplied to the upper input of the exclusive OR gate 548. This indicates that the value most recently stored in the counter 531 is to be compared in width against the value previously stored in the binary counter 533. Since the width of the black bar 16C from the start code stored in the counter 531 is greater than the width of the black bar 16B stored in the counter 533, the output from the adder 532 is at a high level, and the exclusive OR gate provides a more positive output which is forwarded through the gates 547, 549, and 550 to apply a more positive or binary 1 representing signal to the serial in terminal of the data buffer 522. This signal is transferred into the first stage of the buffer 522 under the control of the signal DATA STROBE generated under the control of the signal WHITE OS. At the same time, the previously detected first two bits of the start code are transferred to the second and third stages of the shift register so that this register now contains in the order of reading the binary code 011.

The gates 636 and 637 preserve the width of the second white bar 18B previously stored in the counter 633. The enabling of the gates 625 and 628 permits the value of the first white bar 18A to be cleared from the binary counter 631 and the width of the third white bar 18C to be stored therein in the manner described above.

During continuing relative movement between the record 10 and the reader 12, the reader 12 enters the fourth black bar 16D in the start code. This causes the unit 506 to change its output level, and the flip-flop 508 is set so that the signal BLACK rises to a high level and the signal WHITE drops to a low level. The signal WHITE applies an inhibit to one input of the AND gate 547 so that the black bar storage unit 530 cannot control the transfer of data into the data buffer 522. The leading edge of the positive-going signal BLACK resets the flip-flop 521 so that the inhibited gates 525 and 528 preserve the width of the third black bar 16C in the counter 531. The partial enabling of the gates 536 and 537 permits the width of the second black bar 16B to be cleared from the binary counter 533 and the width of the fourth black bar 16D to be stored therein in the manner described above using the gates 523 and 536. The more positive signal BLACK also partially enables the AND gate 647 so that the white bar storage unit 630 can now perform a width comparison on the second and third white bars 18B and 18C in the start code and enter a bit into the data buffer 522 in dependence thereon and on the status of the flip-flop 621. At this time, the flip-flop 621 is in a set condition so that a low level potential is applied to one input of the exclusive OR gate 648. The set condition of the flip-flips 621 signifies that the value of the third white bar 18C just stored in the binary counter 631 is to be compared with the width of the second white bar 18B previously stored in the binary counter 633. As illustrated in FIG. 2 of the drawings, the width of the third white bar 18C is greater than the width of the second white bar 18B so that the full adder 632 provides a more positive output to the connected input of the exclusive OR gate 648. With the low level potential applied to the other input of this gate, the output of the gate 648 provides a more positive signal which is forwarded through the gates 647, 549, and 550 to be applied to the serial in terminal of the data buffer 522. This more positive signal representing a binary 1 is shifted into the first stage of the buffer 522 by the signal DATA STROBE in the manner described above, and the prior bits are shifted ahead a single stage so that the buffer now stores the partial code 0111, considered in the order of reading.

After traversing the fourth black bar 16D in the start code, the reader 12 enters the while space following the start code and preceding the first characrer code, which white space is not width modulated or controlled or of data significance. At this time, the flip-flop 508 is reset in the manner described above so that the signal BLACK drops to a low level, and the signal WHITE rises to a high level. The leading edge of the signal WHITE resets the flip-flop 621 to change the enabling on the sequencing gates 625, 628, 636, and 637, but these operations are of no significance at this time. The low level signal BLACK inhibits the AND gate 523 so that the settings of the binary counters 531 and 533 cannot be altered during the comparison of the width of the fourth black bar just stored in the counter 533 with the width of the third black bar previously stored in the counter 531. This comparison is enabled by the high level signal WHITE applied to one input of the AND gate 547.

More specifically and as shown in FIG. 2 of the drawings, the width of the fourth black bar 16D stored in the binary counter 533 is less than the width of the third black bar 16C previously stored in the binary counter 531. Thus, the full adder 532 provides a more positive output to the connected input of the exclusive OR gate 548. Since the flip-flop 521 is now in a reset condition, a more positive potential is applied to the other input of the gate 548, and the output of this gate is at a low level. Thus, a low level or binary "0" representing potential is applied to the serial in terminal of the data buffer 522 to be stored in the first stage of the buffer 522 on the appearance of the signal DATA STROBE. This signal also shifts the previously entered data bits so that the complete start code 01110 is now stored in the data buffer 522.

With a complete and correct start code now stored in the data buffer 522, a decoder shown in the Dobras application detects either this start code read in a forward direction or a stop code read in a backward direction to change the mode of the system 14 from a scan mode of operation to a read mode of operation in which the following message material is interpreted. During the initial scan mode, as contrasted with the read mode, the decoder examines the contents of the data buffer 522 as each bit of information is shifted into this buffer so that the system 14 in the scan mode effectively continuously monitors input data looking for a proper start code. When, however, a proper start code is detected, the system 14 changes so that it interrogates the contents of the data buffer 522 only as each complete character code is received.

The circuitry for performing this operation is shown and described in detail in the Dobras application. In general, this control is achieved by the use of a character clock signal CH CLK. The signal DATA STROBE controls a monostable circuit (not shown), the output of which is supplied to an AND gate with an inverted clock signal CLK/ to generate a bit clock signal BIT CLK (line 4 in FIG. 4). This signal, a signal ZERO STATE (FIG. 6), and a signal START/ which is provided by the circuitry in the Dobras application whenever the system 14 is in its scan mode control the generation of the character clock signal CH CLK which is coincident with and of the same duration as the bit clock signal BIT CLK so long as the system 14 is in its scan mode. This signal CH CLK enables the decoding of the contents of the data buffer 522 as each data bit is strobed into this buffer.

When, however, a proper start condition is detected, either a start code read in a forward direction or a stop code read in a reverse direction, the circuitry shown in the Dobras application places the signal START/ at a low level and resets an error flip-flop 674 (DFIG. 6) by supplying a brief positive-going signal over the line connected to the reset terminal of this flip-flop. Placing the signal START/ at a low level removes a continuous reset applied to a binary counter 668 and a mod 4 counter 654. The change in the status of the signal START also controls the generation of the character clock signal CH CLK so that it now appears only following the receipt of each five valid data bits by the data buffer 522 defining a true message character.

More specifically and considering, for example, the code for the numerical character one shown in FIG. 2, the circuit 500 supplies eight rather than five bits of information for each character code, three of which are spurious. The five valid bits are defined by the comparisons described in some detail above. The circuit 500, however, also sequentially performs a comparison between the widths of the last white bar 18C in a code and the white space preceding the next code, a comparison between the widths of the last black bar 16D in one code and the first black bar 16A of the next code, and a comparison between the widths of the code separating white space and the first white bar 18A in the new code. These three comparisons result in spurious bits at the leading edges of the bars 16A, 18A, and 16B of each new code, respectively. In the present application as well as in the Dobras application, the establishment or detection of these three spurious bits is not suppressed, but these bits are shifted through the data buffer 522 without interpretation, and the contents of the data buffer 522 are transferred to the interpreting or utilizing means only when the following proper five bits are in storage in the buffer 522. This is accomplished by control over the generation of the character clock signal CH CLK so that this signal is generated by the circuitry shown in the Dobras application only when five valid bits are in storage in the data buffer 522 in the read mode. This control is exercised by the mod 4 counter 654 and the decoder 656 in an error detection circuit 650 (FIG. 6).

More specifically, the signal CH CLK is generated in exactly the same manner as described in the Dobras application under the control of the signal ZERO STATE provided by the decoder 656 in dependence on the setting of the counter 654. This counter is advanced by the signals WHITE OS generated as the reader leaves each black bar 16A-D of each code. The signal ZERO STATE drops to a low level at the leading edge of the white bar 18A and rises to a high level at the leading edge of the intercode white space to enable the generation of the signal CH CLK for one bit clock signal BIT CLK (line 4 of FIG. 4). Accordingly, the three sequential bits resulting from the comparison of the third bar 18C in one code and the white space separating codes, the comparison of the last black bar 16D in one code and the first black bar 16A in the following code, and the comparison between the white space separating codes and the first white bar or space 18A in the following code are shifted through the five stages of and out of the data buffer 522 as the mod 4 counter 654 reaches a count of four. When this count is reached to provide the high level signal ZERO STATE, the five valid bits are stored in the buffer 522, and this signal is effective as described in detail in the Dobras application to control the production of the signal CH CLK which transfers the valid five bits out of the data buffer 522.

As a specific example and assuming that the first character code following a complete start code is being interpreted by the reader 12, the three spurious birs arising from the white space interposed between the start code and the following code and from the comparison of the last bar 16D of the start code and the first bar 16A of the following character code are shifted into the first three stages of the data buffer 522. Thereafter the circuit 500 detects or translates the next five bits which are significant data bits in the manner described above in conjunction with the translation of the start code. As these five bits are shifted into the shift register in the data buffer 522, the three spurious bits are shifted out of the end of the shift register in the data buffer 522. Thus, as the fifth significant bit is shifted in, the signals DB1-DB5 provide a complete, valid character code. Further, the four signals WHITE OS developed by the code separating white space and the three white bars 18A-18C in the valid character code advance the mod 4 counter 654 through a cycle so that the character clockd signal CH CLK is generated.

The trailing edge of the signal CH CLK triggers a monostable 556 to provide a more positive signal TRANSFER of the indicated duration (FIG. 5A). This signal is effective in the manner described in detail in the Dobras application to render a decoder effective to receive the signals DB1-DB5 provided by the data buffer 522 to translate these signals and to apply the translated signals to a utilization device such as a computer input or a display.

The interpreting circuit 500 continues to translate the codes for the different characters of the message until the message has been completely translated and transferred to the utilization means. The stop code is then read in a forward direction and stored in the data buffer 522 in the manner described above. When a valid stop condition, such as a stop code read in the forward direction or a start code read in a reverse direction, is stored in the data buffer 522, this is detected by the circuitry shown in the Dobras application, and the system 14 is returned from the read mode into the scan mode so that the character clock signal CH CLK, for example, is now generated as each bit is transferred into the data buffer 522. In addition, the start signal START is removed so that the signal START/ rises to a high level and resets, for example, the counters 654 and 662. The return of the signal START/ also clears the data buffer 522.

More specifically, when the signal START/ goes positive, the leading edge of this signal is effective through a gate 552 to trigger a monostable circuit 544 for the duration indicated in the logic block for the circuit 554 which is equal to or greater than five clock periods. When the monostable circuit 554 is set, the lower input to the AND gate 550 is inhibited so that only a binary 0 can be entered into the shift register in the data buffer 522. The monostable circuit 554 also provides a more positive signal CLEAR OS which is applied to the lower input of an AND gate 518. This enables the gate 518 so that five clock pulses CLK can pass through this gate and the OR gate 520 to provide five signals DATA STROBE for clocking five binary 0s into the shift register in the data buffer 522. In this manner, the data buffer 522 is cleared at the completion of the read operation.

When a record or label 10, 20 is read in a reverse direction, the system 14 operates in substantially the same manner as described above with the exception of the codes used to detect the start and the finish of the message and with the further exception of the manner in which the message stored in the buffer 522 is transferred to the output unit. More specifically, as the reader 12 moves over the stop code which is the first code encountered when the message is read in a reverse direction, the bits 11011, when considered from rifht to left in FIG. 2, are stored in the data buffer 522. Since the character clock signal CH CLK is generated as each bit is shifted into the data buffer 522, this signal is effective to enable the decoder shown in the Dobras application when a complete reverse read stop code is stored in the buffer 522 to provide a control signal indicating a proper start condition. In addition, this control circuit provides a signal BACKWARD indicating that the record 10, 20 is being read in a reverse direction.

The reader 12 then translates the first character in the message read in the reverse order, which is the last character in the message when read in the forward direction. Assuming that the last character in the message is one, the shift register in the data buffer 522 is provided with the bits 00110, considered from right to left in FIG. 2, and this bit message is not a correct code for the character one. Accordingly, the contents of the data buffer 522 must be reversed in order and complemented to obtain a correct character code, and the contents of the buffer 522 should be transferred to the display unit as the least significant rather than the most significant digit in the message.

This control is achieved when the monostable circuit 556 is triggered by the trailing edge of the signal CH CLK at the end of the character in the manner described above to provide the more positive signal TRANSFER. The signal TRANSFER completes the enabling of the gate 558 whose other inputs comprise the more positive signal BACKWARD and a signal CMP/ which is normally in a more positive state except when a valid stop code is being read. The more positive output from the gate 588 is applied to the mode input of the data buffer 522. Accordingly, on the next clock signal CLK applied to the clock 2 input to the data buffer 522, the contents of the shift register in the data buffer are reversed in order and complemented. Thus, the contents of the data buffer 522 now provide a correct code for the message character one. Since this character one is the last or least significant digit in the message, this character is to be transferred from the data buffer 522 to the utilization device in a position indicating its least significant character. This is accomplished by the circuitry shown in the Dobras application under the control of the signal EXCHANGE developed at the output of the AND gate 558.

The transfer of the remainder of the message to the utilization device takes place in the manner described above until such time as the start code which provides the termination of a message read backwards is encountered by the reader 12. When the code 10001, considered from right to left in FIG. 2, is stored in the buffer 522, this code is recognized as a valid stop condition by the control circuitry, and the system 14 is returned from the read mode of operation to the normal scan mode of operation in the manner described above. In addition, the circuitry shown in the Dobras application drops the level of the signal CMP/ to a low level to inhibit the gate 558 so that the start code read in a reverse direction is not transferred to the utilization device. As the system 14 is reset, the signal BACKWARD drops to its normal low level.

The system 14 also includes a number of error checking means for preventing the transfer of invalid or improper data to the utilization means. These errors include an excessive number of characters in the message, the storage of an excess width value in one of the counters 531, 533, 631, 633, and the receipt of a character that is not in a proper odd parity code.

More specifically, if either of the black bar counters 531 or 533 is supplied with a width value exceeding the storage capacity of these counters, a more positive signal BACK OVERFLOW is provided by an OR gate 534 or a signal WHITE OVERFLOW is provided by an OR gate 634. These two signals are supplied to the inputs of an OR gate 542 to set a toggle-type flip-flop 546 so that a more positive signal OVERFLOW is provided. This signal is effective through the OR gates 526, 540, 626, and 640 to reset all of the counters 531, 533, 631, and 633. This signal is also applied to one input of an OR gate 672 in the error checking circuit 650 to set the toggle-type error flip-flop 674. When the flip-flop 674 is set, a more positive error signal ERROR is provided. This signal resets the utilization means shown in the Dobras application and automatically returns the system 14 from a read mode to a scan mode. In addition, the signal ERROR is forwarded through the OR gate 552 to trigger the monostable circuit 554 so that the data buffer 522 is also cleared.

This return to the scan mode requires the operator to reinitiate the scanning of the message on the record 10, 20. When the first black or white bar is again encountered during this scanning to generate either of the signals BLACK OS or WHITE OS, this signal is forwarded through an OR gate 544 to reset the overflow flip-flop 546. This completes the restoration of the system 14 and frees the counter 531, 533, 631, and 633 to receive subsequent message or control information. Whenever a valid start indication is received, the flip-flop 674 is reset in the manner described above.

Another check made by the error detecting circuit 650 is for the receipt of a message containing an excess number of characters. The data utilization or display means disclosed in the Dobras application is assumed to be capable of accepting a given number of characters or digits. If the message decoded by the reader 12 in the system 14 includes more than this given number of characters, these additional characters would be lost. Accordingly, the error detecting circuit 650 includes the binary counter 668 having a counting capacity in excess of the maximum number of digits accepted by the output means. The output of the binary counter 668 is coupled to the input of a decoder 670. This decoder supplies a more positive output whenever the input from the binary counter 668 indicates a total count in excess of the number of digits that can be accepted by the utilizing means in the system 14.

The binary counter 668 includes a reset terminal supplied with the signal START/. As set forth above, this signal remains at a high or positive level so long as the system 14 is in the scan mode. Thus, the binary counter 668 is held in a reset condition during the scan mode. When, however, the system is shifted into its read mode to translate and store characters of the message, the signal START/ drops to a low level, and the continuous reset is removed from the binary counter 668. The counting input of the binary counter 668 is supplied with the character clock signal CH CLK. As set forth above, this signal rises to a more positive level following the receipt of each significant five bits of a message character. Accordingly, the binary counter 668 counts the number of characters in the received message. When the number of received characters exceeds the given number, the decoder 670 provides a more positive output through the OR gate 672 to set the error flip-flop 674. The setting of the error flip-flop 674 returns the system 14 to its scan mode in the manner described above so that a new proper start condition is required to reset the error flip-flop 674. Incident to the restoration of the system 14 to its scan mode, the signal START/ rises to a more positive potential to clear the binary counter 668 and to remove the more positive output from the decoder 670.

Another error detected by the circuit 650 is the receipt of a complete code for a message character which is not in a proper odd parity code. This error detection is performed by an AND gate 658, a mod 5 counter 662, a decoder 664, and an AND gate 666. The mod 5 counter 662 is reset to a normal condition by an AND gate 660 during the scan mode and at the end of the reading of each character into the data buffer 522 in the manner described in detail in the Dobras application. Thus, the mod 5 counter 662 is normally in a reset condition at the beginning of the translation of each character code.

The counting input to the counter 662 is connected to the output of the AND gate 658 which is provided with two input signals DATA and DATA STROBE and the output from an AND gate 652. The AND gate 652 is provided with two input signals REFF/ from the circuitry shown in the Dobras application and a signal COUNT 1/ from the decoder 656.

As set forth in the Dobras application, the signal REFF/ becomes positive as soon as the first black bar 16A is passed by the reader 12 or when this reader enters the first white bar 18A. The signal COUNT 1/ is normally at a more positive level and drops to a low level to inhibit the AND gate 652 when the first black bar 16A is counted by the mod 4 counter 654 and remains at a low level until the second black bar 16B is counted. With this combination of signals, the AND gate 652 is inhibited by the signal REFF/ through the intercode white space and the first black bar 16A and by the signal COUNT 1/ from the trailing edge of the first black bar 16A to the trailing edge of the second black bar 16B. The gate 652 is thereafter fully enabled to apply a more positive potential to the connected input of the AND gate 658. Thus, the signal provided at the output of the gate 652 provides an inhibit for the gate 658 during those intervals in which spurious bits are developed by the interpreting circuit 500.

The signal DATA STROBE appears following the signal WHITE OS used to advance the counter 654 so that if a 1 is present in the signal DATA providing the input to the data buffer 522 at any time following the trailing edge of the second bar 16B, a positive input signal to the mod 5 counter 662 is provided. Thus, during the five valid bits of each character code, the AND gate 658 provides a more positive counting input to the counter 662 so that this counter totals the number of binary 1s in each received character code.

The decoder 664 provides a more positive output signal EVEN COUNT to one input of the gate 666 whenever an even number of ones have been accumulated in the counter 662. The signal EVEN COUNT is at a low level whenever an odd number have been accumulated. Assuming that the signal EVEN COUNT is at a high level, one input to the gate 666 is enabled. Another input to this gate is enabled by the signal START which is at a more positive level whenever the system 14 is in a read mode. When the character clock signal CH CLK occurs at the end of the character, the gate 666 is fully enabled to forward a more positive signal through the OR gate 672 to set the flip-flop 674 to provide an indication that a parity error has been encountered in the translated character code. The setting of the error flip-flop 674 returns the system to its scan mode and clears the output. The flip-flop 674 is reset in the manner described above.

The mod 5 counter 662 is reset under the control of a gate 660 provided with the signal ZERO STATE from the output of the decoder 656 and a signal RESET T which is generated one-half clock period following the character clock signal CH CLK. Accordingly, whenever the signal ZERO STATE becomes positive indicating that a complete character has been counted and one-half clock period following the character clock signal CH CLK, the signal RESET T fully enables the AND gate 660 to reset the counter 662 for the next character received.

Although the present invention has been described with reference to a single illstrative embodiment thereof, it should be understood that numerous other modifications and embodiments can be devised by those skilled in the art which fall within the spirit and scope of the principles of the present invention.

What is claimed and desired to be secured by Letters Patent of the United States is:

1. A coded record adapted for machine reading comprising
    a record member,
    and a series of areas of different first and second characteristics on said record member, the areas of first and second characteristics being alternated with each other in said series, the relative dimensions of pairs of areas of the first characteristic and the relative dimensions of pairs of areas of the second characteristic providing coded representations of bit values, wherein the coded representations of bit values are provided by consecutive pairs of areas of the first characteristic and consecutive pairs of areas of the second characteristic.

2. The coded record set forth in claim 1 in which the coded bit values are 0 and 1 with one of these values represented by an increase in the dimension of any consecutive pair of areas of like characterstic, and the other of these values represented by a decrease in the dimension of any consecutibe pair of areas of like characteristic.

3. The coded record set forth in claim 1 in which one area in each pair of areas has a dimension which compared with a reference set by the dimension of the other area in the pair establishes bit value.

4. A coded, printed record adapted for machine reading comprising
    a record member,
    and a series of areas of a first characteristic printed on said record member and separated by unprinted areas hereinafter referred to as areas of a second characteristic, the areas of first and second characteristics being alternated with each other, wherein the absolute widths of the printed areas of said first characteristic are permitted to be printed wider or narrower, thereby affecting the absolute widths of the areas of said second characteristic in the opposite sense, in response to changes in the nature and/or quality of the printing, up to but not beyond the point where the printed areas almost merge with one another or almost disappear, and wherein the relative dimensions of pairs of areas of the first characteristic and the relative dimensions of pairs of areas of the second characteristic separately provide coded representations of bit values which coded representations are preserved in spite of said changes in the nature and/or quality of the printing.

5. A method of encoding a record which comprises the steps of
    producing on a record a series of areas of different first and second characteristics alternated with each other,
    assigning different pairs of areas of said first characteristic and different pairs of areas of said second characteristic to represent different bits to be encoded,
    and varying the relative sizes of the areas in said different pairs to represent the bits to be encoded.

6. The method set forth in claim 5 in which the bits have values of 0 and 1, and the step of varying the relative sizes includes increasing the size of one area in a pair relative to the size of the other area in the pair to represent one of the values 0 and 1 and decreasing the size of one area in a pair relative to the size of the other area in the pair to represent the other one of the values 0 and 1.

7. A method of interpreting records coded with a sequence of areas of different characteristics and sizes alternated with each other using a reader responsive to the different characteristics which comprises the steps of
    producing relative movement between the reader and the areas,
    determining the sizes of the areas of both characteristics in the sequence of areas,
    comparing the determined sizes of pairs of areas of like characteristics and including pairs of areas of both characteristics to establish a greater than or less than relation between the size of one area in each pair and the other area in said pair,
    and providing code values in dependence on the established greater than and less than relations.

8. The method set forth in claim 7 in which the step of comparing sizes of pairs of areas of like characteristic includes first comparing the size of a given area with the size of a prior area and second comparing the size of said given area with the size of a subsequent area,
    and the step of providing code values includes providing a code value in dependence on said first comparing and providing a code value in dependence on said second comparing.

9. A method of decoding records coded with a sequence of areas of different first and second characteristics alternated with each other wherein pairs of areas of like characteristics are used to estabblish code values using a reader responsive to the different characteristics which comprises the steps of
    a. producing relative movement between the reader and the areas,
    b. determining the size values of one area in the pairs of areas of the first characteristic,
    c. establishing reference values based on the sizes of the other areas in the pairs of areas of the first characteristic,
    d. comparing the determined size and reference values of corresponding area pairs to establish the relations therebetween,
    e. providing code values in dependence on the established relations, and
    f. performing the above steps (b)-(e) for the pairs of areas of the second characteristic.

10. A system for translating a record encoded with alternate areas of different first and second characteristics and different sizes, comprising
    first and second pairs of registers,
    record controlled means coupled to the first and second pairs of registers and controlled by the record for storing representations of the sizes of different areas of the first characteristic in the first pair of registers and for storing representations of the sizes of different areas of the second characteristic in the second pair of registers,
    comparing means coupled to the first and second pairs of registers,
    control means coupled to the comparing means for rendering the comparing means effective to compare the two sizes stored in the first pair of registers alternately with the two sizes stored in the second pair of registers, and indicating means coupled to the comparing means and controlled by the results of the size comparisons for supplying bit representations.

11. A system for reading a record encoded with areas of first and second characteristics and different sizes comprising a pair of first registers,
a pair of second registers,
record reading means controlled by the record and supplying signals representing the sizes of the areas of first and second characteristics,
first sequence control means coupled to the record reading means for storing signals representing the sizes of areas of the first characteristic in the pair of first registers and signals representing the sizes of the areas of the second characteristic in the pair of second registers,
second sequence control means coupled to the pair of first and second registers for storing successive signals representing the sizes of areas of the first characteristic in alternate ones of the pair of first registers and for storing successive signals representing the sizes of areas of the second characteristic in alternate ones of the pair of second registers,
and comparing means coupled to the pairs of first and second registers for alternately determining the relative sizes of the areas stored in the pair of first registers and in the pair of second registers, said comparing means including means for providing a code value indication in dependence on the relative sizes.

12. The system set forth in claim 11 in which the comparing means includes means for comparing an area size stored in a given one of the pair of first registers with two different area sizes stored at different times in the other one of the pair of first registers, and the comparing means includes means for comparing an area size stored in a given one of the pair of second registers with two different area sizes stored at different times in the other one of the pair of second registers.

13. The system set forth in claim 12 in which the comparing means includes means controlled by the second sequence control means for reversing the relative significance of the area sizes stored in said given ones of the first and second registers as they are compared with the two different area sizes stored in said other ones of the first and second registers.

14. An apparatus for reading a record encoded with alternate areas of different first and second characteristics and different sizes comprising reader means responsive to the areas on the record,
first means coupled to the reader means for storing and comparing the sizes of areas of the first characteristic to establish data values,
second means coupled to the reader means for storing and comparing the sizes of areas of the second characteristic to establish data values,
storage means coupled to the first and second means for storing the established data values,
and control means coupled to the reader means and responsive to the characteristics of the areas for selectively rendering different ones of the first and second means effective to control the storage means.

15. An apparatus for reading a record with values encoded by N spaced areas of different first and second characteristics comprising a record controlled reader means providing a sequence of different first and second signals in accordance with the areas of said different first and second characteristics,
more than two but less than N separate register means for storing representations of the areas on the record,
sequence control means coupled to the reader means and all of the register means and controlled by said first and second signals for storing representations of different areas in different ones of the register means as the record is read by the reader means,
and control means coupled to and controlled by the representations in different pairs of the register means for decoding the values.

16. The apparatus set forth in claim 15 in which the control means is coupled to and controlled by the sequence control means and is responsive to the sequence of said first and second signals in decoding values.

17. The apparatus set forth in claim 15 in which
the sequence control means includes means for clearing said register means in a sequence with one of said register means being cleared as each of said first and second signals is provided.

18. An apparatus for reading a record with values encoded by N spaced areas of different first and second characteristics comprising a record-controlled reader means providing a sequence of different first and second signals in accordance with the areas of said different first and second characteristics,
register means for storing more than two but less than N representations of the areas on the record,
control means coupled to the register means and the reader means and controlled by said first and second signals for storing said sequence of representations of different areas in said register means as the record is read by the reader means on a FIFO basis, such that the representation that has been stored the longest within the register means is removed therefrom whenever a new representation in said sequence is stored therein, and
comparing means having inputs connected to said register means for comparing pairs of representations for areas of like characteristics to one another, and including means for generating a digital signal representing the result of the comparison operation.

19. An apparatus in accordance with claim 18 wherein said register means includes at least first, second, and third individual representation storage registers, wherein said control means includes means for loading said three storage registers with a sequence of adjacent area representations such that said second register contains a representation of an area whose characteristics are opposite to the characteristics of the areas whose representations are stored in said first and third registers, and wherein said comparing means includes at least one comparing device having a first input connecting to said first storage register and having a second input connecting to said third storage register.

20. An apparatus in accordance with claim 18 wherein sauid register means includes at least first, second, third, and fourth individual representation storage registers, wherein said control means includes means for loading said four storage registers with a sequence of adjacent area representations such that said second and fourth registers contain representations of areas whose characteristics are opposite to the characteristics of the areas whose representations are stored in said first and third registers, and wherein said comparing means includes at least two comparing devices, one having a pair of inputs connecting respectively to said first and third storage registers, and another having a pair of inputs connecting respectively to said second and fourth storage registers.

* * * * *

UNITED STATES PATENT OFFICE
CERTIFICATE OF CORRECTION

Patent No. 4,012,716        Dated March 15, 1977

Inventor(s) Carlos B. Herrin

It is certified that error appears in the above-identified patent and that said Letters Patent are hereby corrected as shown below:

```
Column          line 9,   change "1-9, 0" to --"1-9", "0"--
                line 28,  after "codes" insert --coded--
Column 3,       line 56,  change "8" to --18--
Column 4,       line 7,   change "10011" to --"10011"--
                line 36,  change "10011" to --"10011"--
                line 51,  change "00110" to --"00110"--
                line 52,  change "01100" to --"01100"--
                          change "10011" to --"10011"--
Column 6,       line 51,  delete "Thecounter 654"
                          after "The counter" insert --654 selects--
                line 57,  change "CLK/through" to --CLK/ through--
Column 7,       line 16,  change "Q" to --"Q"--
                line 59,  change "and" to --an--
Column 8,       line 30,  change "Q" to --"Q̄"--
                line 52,  change "and" to --an--
Column 9,       line 2,   change "positivegoing" to --positive-going--
Column 12,      line 51,  change "Q" to --Q̄--
Column 13,      line 59,  change "011" to --"011"--
Column 14,      line 42,  change "0111" to --"0111"--
                line 44,  change "while" to --white--
                line 45,  change "characrer" to --character--
```

UNITED STATES PATENT OFFICE
CERTIFICATE OF CORRECTION

Patent No. 4,012,716　　　　　　　　Dated March 15, 1977

Inventor(s) Carlos B. Herrin

It is certified that error appears in the above-identified patent and that said Letters Patent are hereby corrected as shown below:

```
Column 15, line  8, change "01110"    to --"01110"--
          line 47, change "(DFIG. 6)" to --(FIG. 6)--
Column 16, line 48, change "birs"     to --bits--
          line 66, change "clockd"    to --clock--
Column 17, line 52, change "11011"    to --"11011"--
          line 53, change "rifht"     to --right--
          line 68, change "00110"     to --"00110"--
Column 18, line 35, change "10001"    to --"10001"--
          line 57, change "BACK"      to --BLACK--
Column 21, line  2, change "illstrative" to --illustrative--

Column 21, line 28, change "consecutibe" to --consecutive--
Column 22, line 37, change "estabblish"  to --establish--
Column 25, line  2, change "sauid"       to --said--
```

Signed and Sealed this twenty-sixth Day of July 1977

[SEAL]

Attest:

RUTH C. MASON
Attesting Officer

C. MARSHALL DANN
Commissioner of Patents and Trademarks